Jan. 29, 1963  F. S. AMBROSE  3,075,644
MATERIALS SEPARATING APPARATUS AND DRIVE MECHANISM THEREFOR
Filed July 9, 1957  15 Sheets-Sheet 1
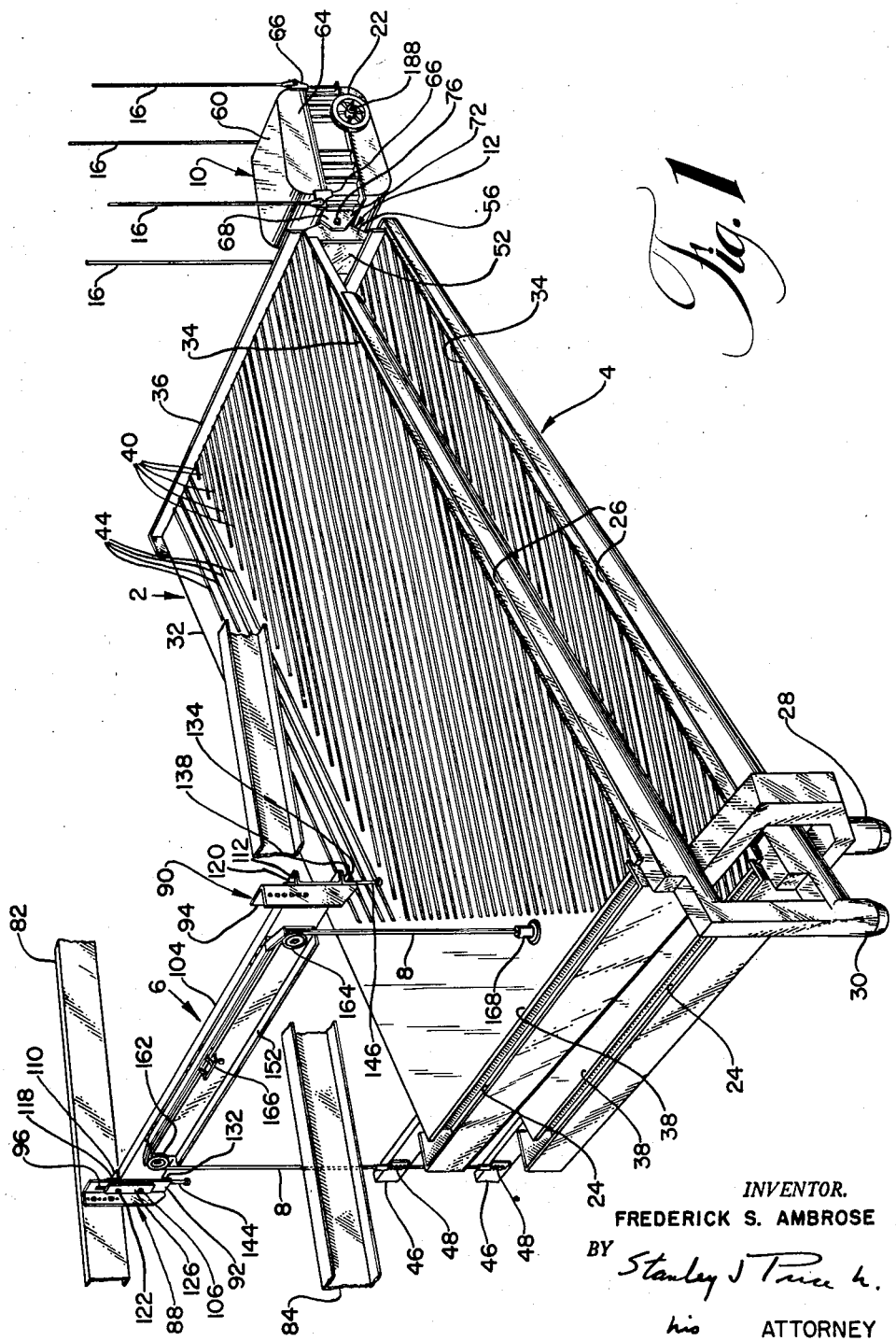
INVENTOR.
FREDERICK S. AMBROSE
BY Stanley J. Price Jr.
his ATTORNEY

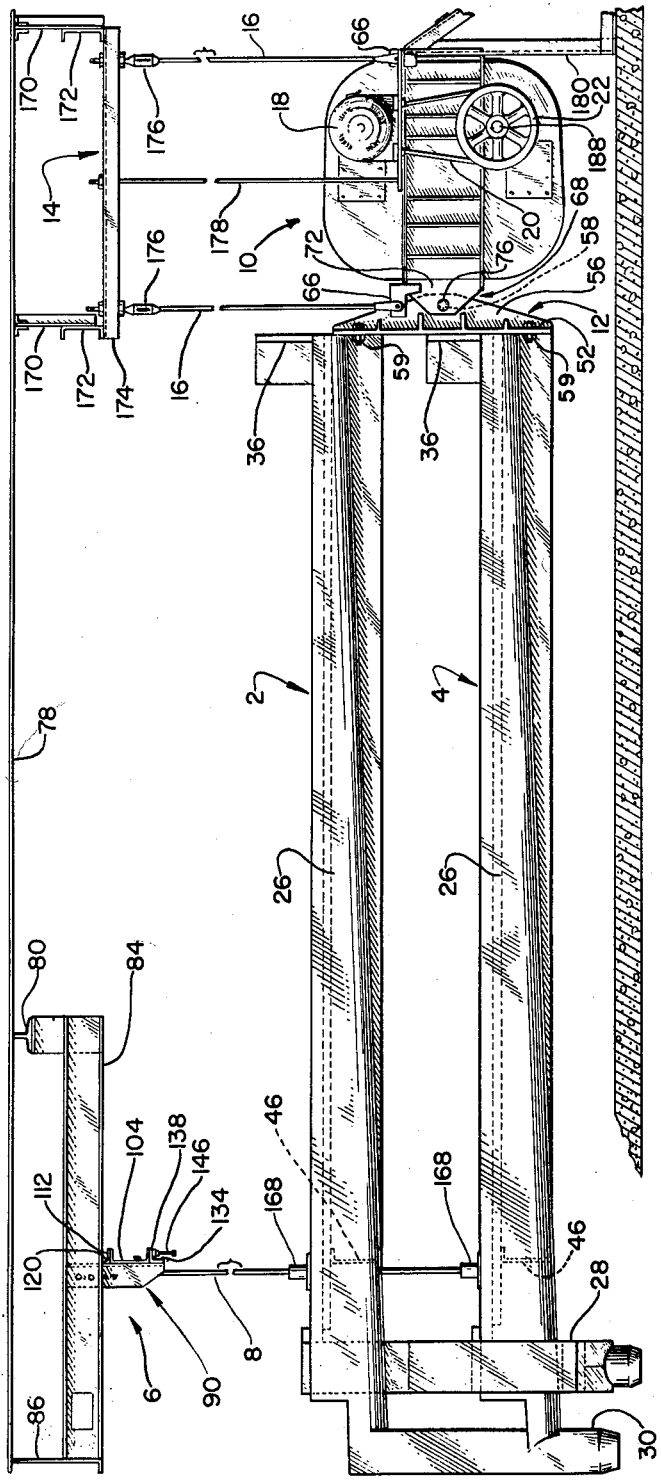

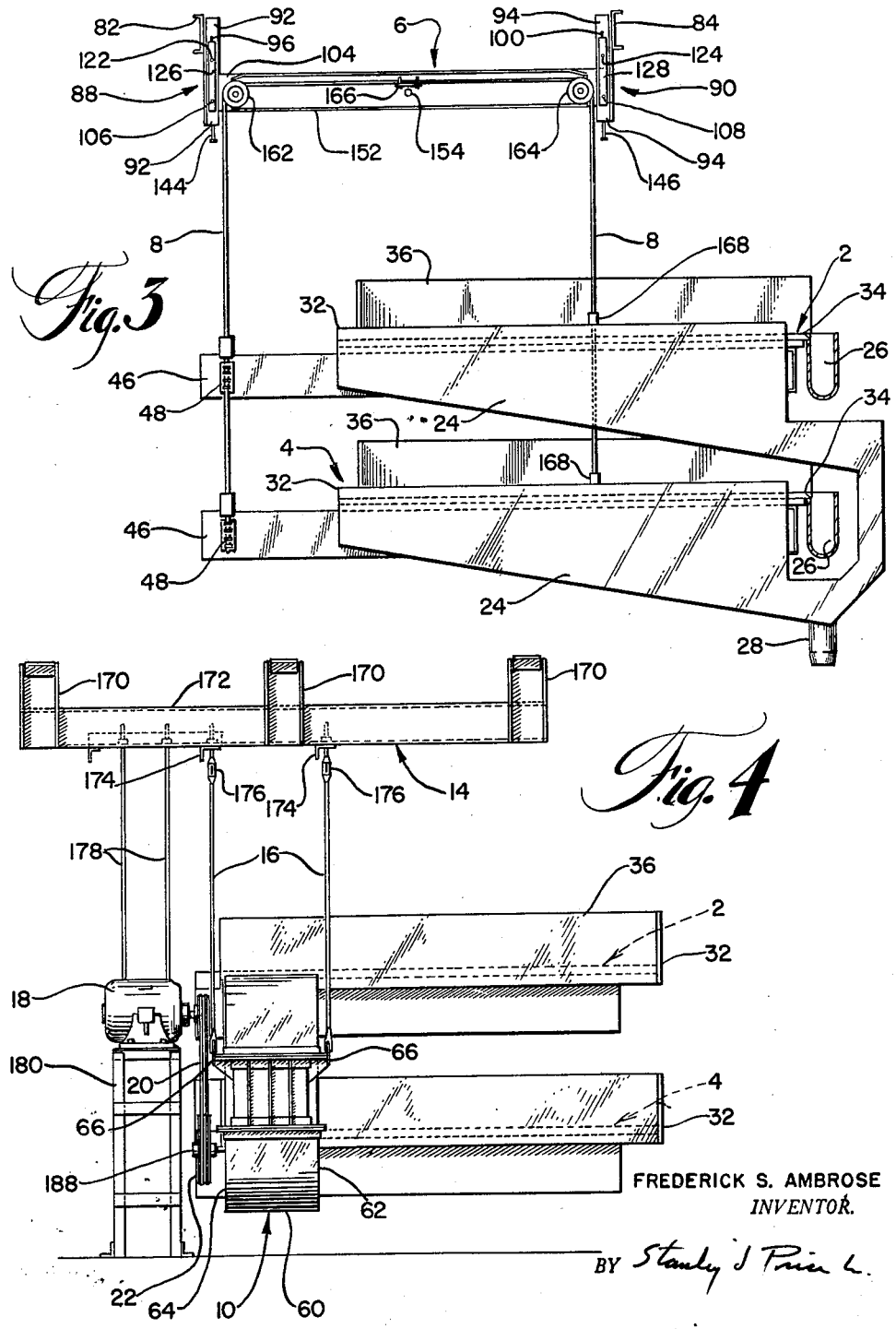

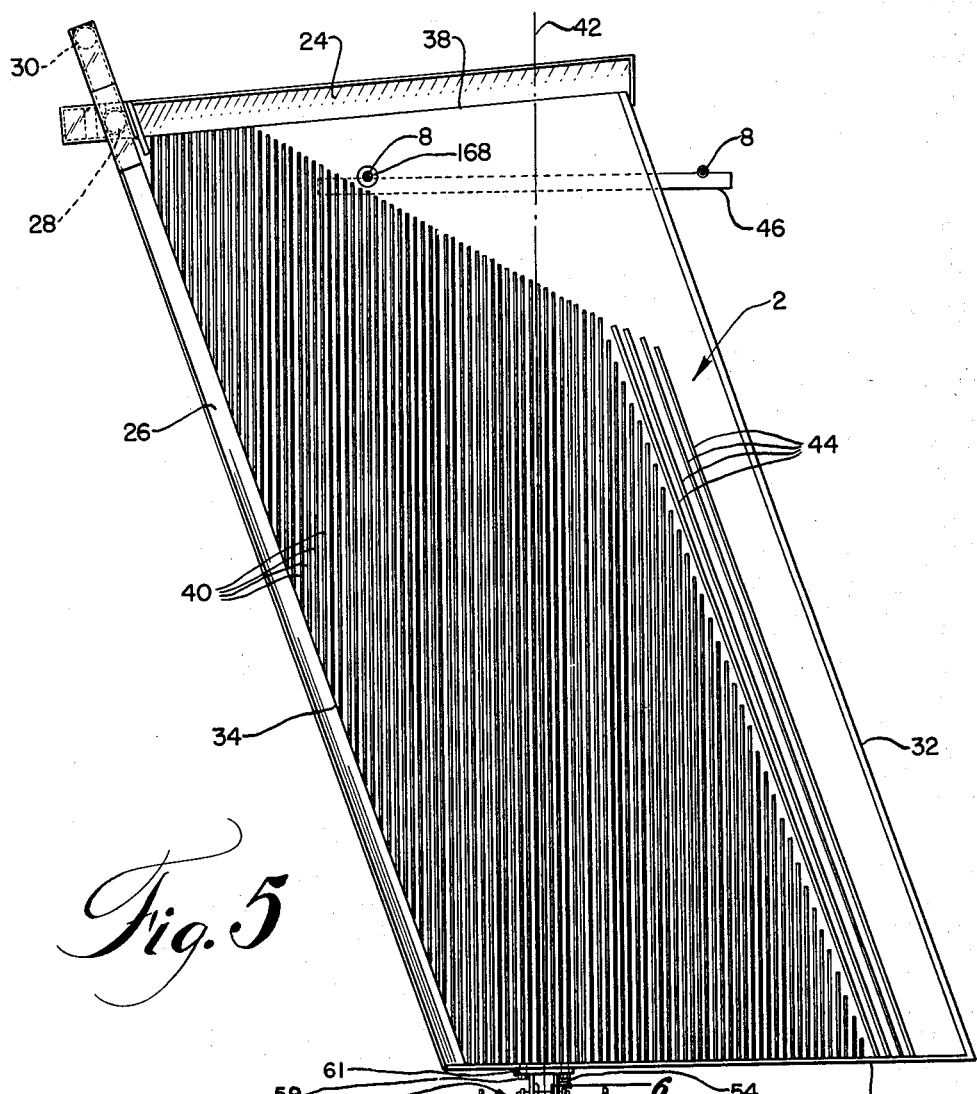

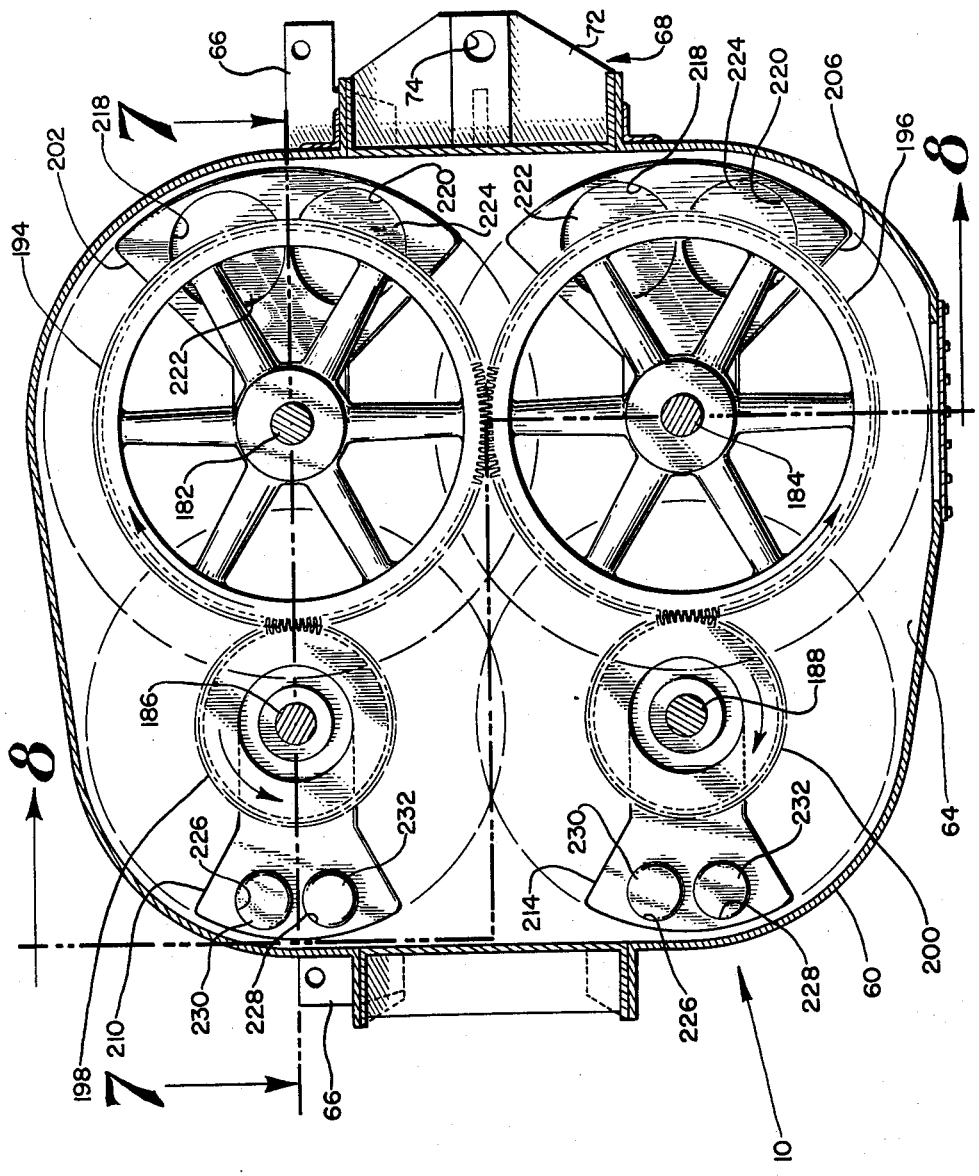

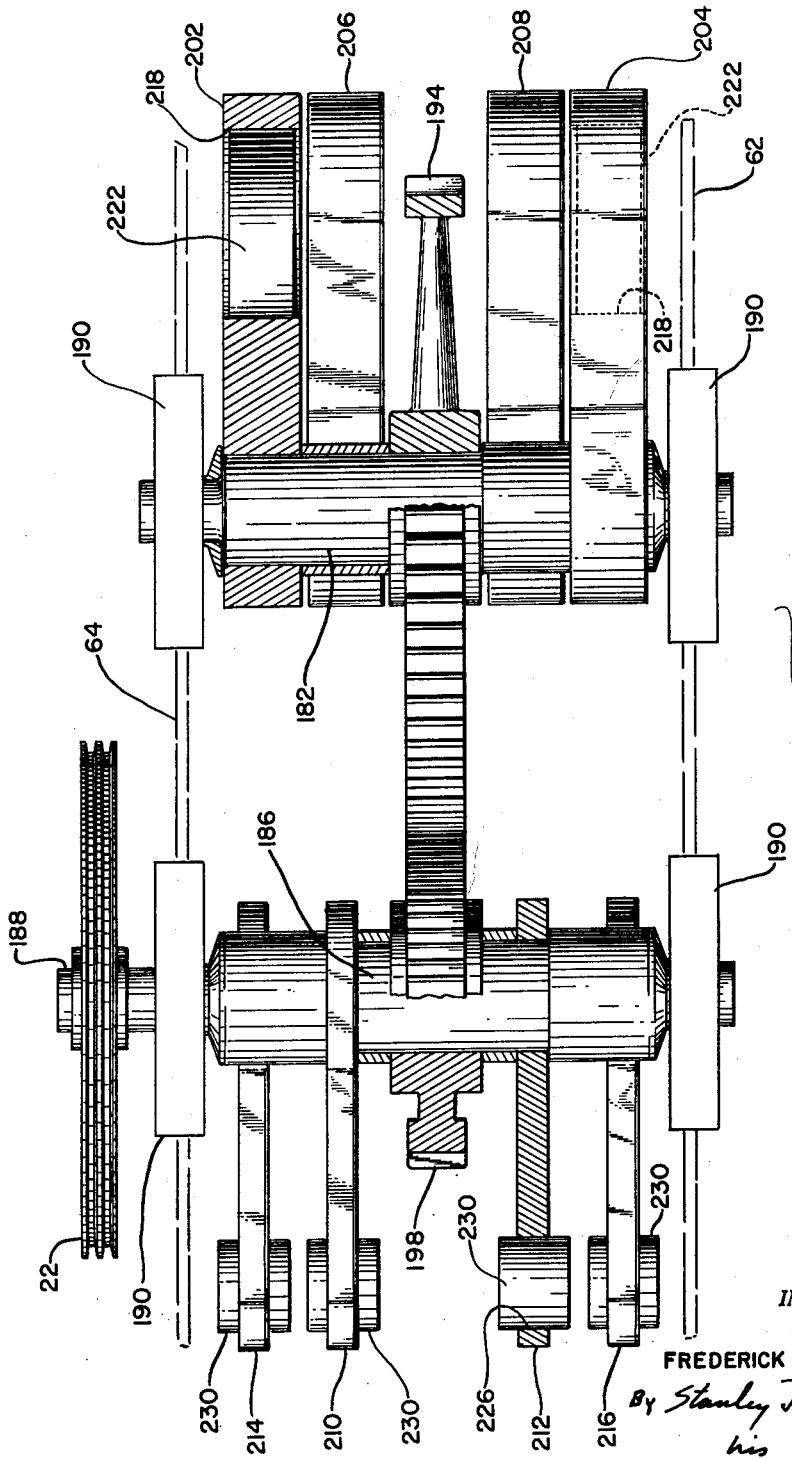

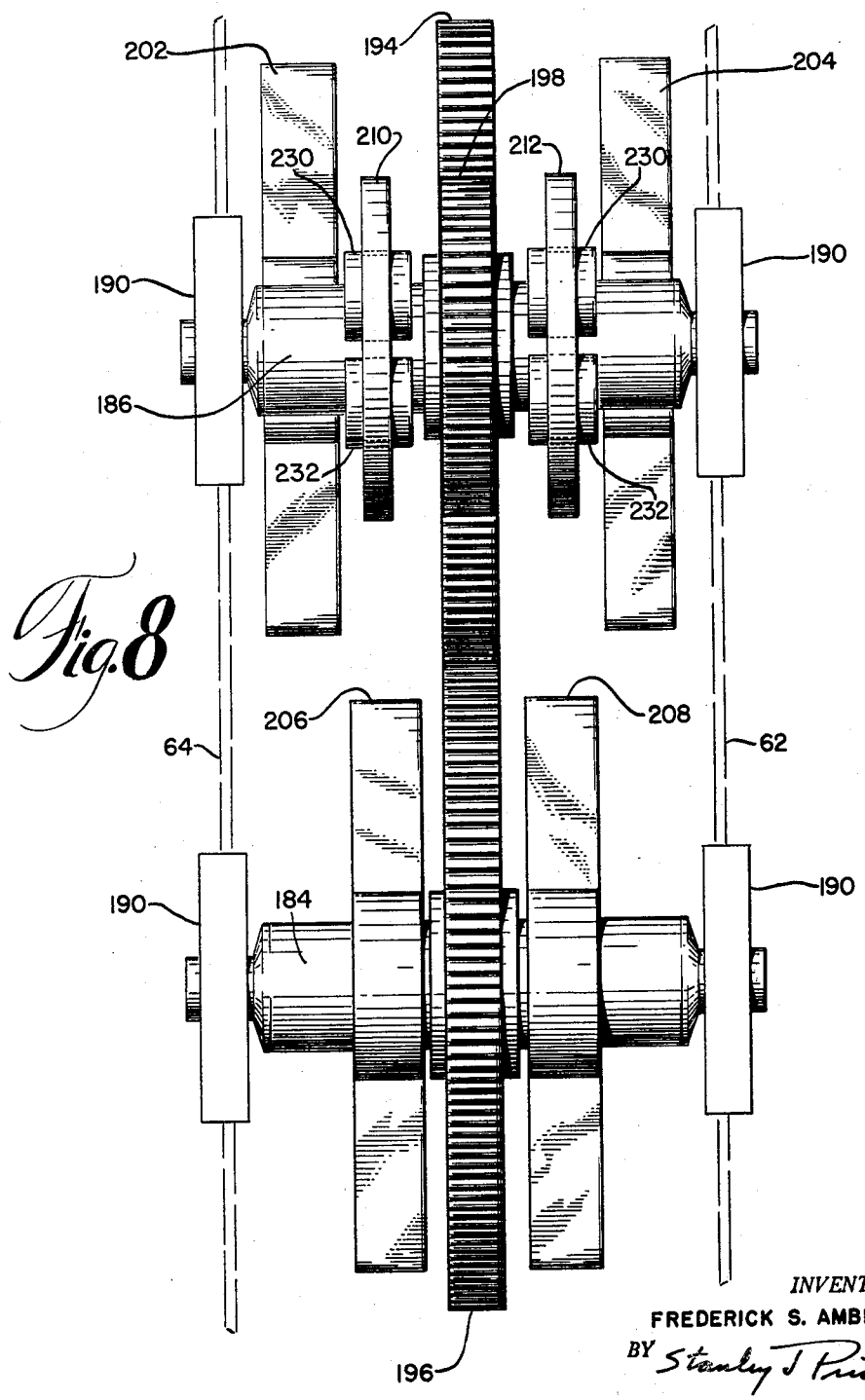

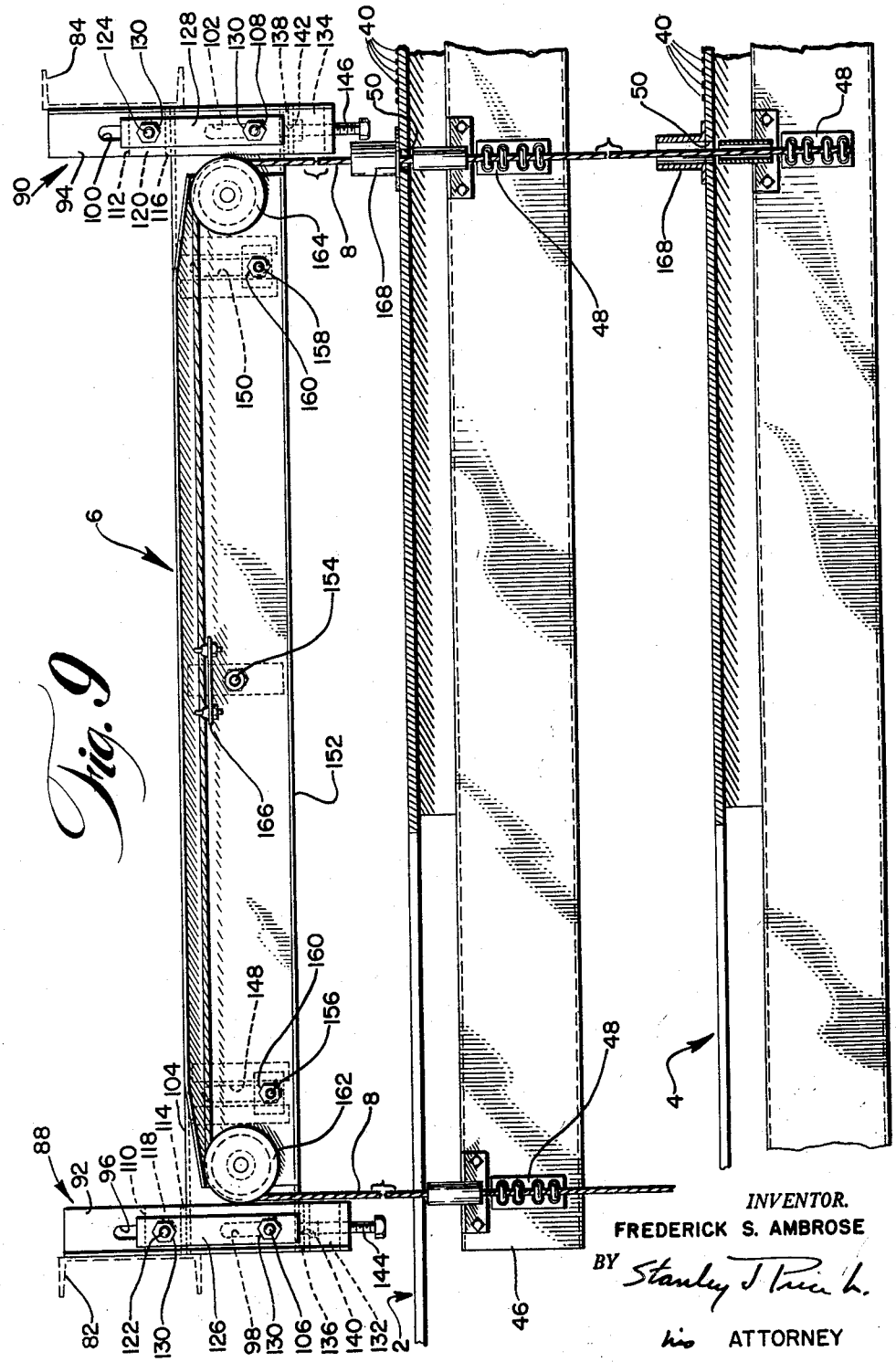

Jan. 29, 1963     F. S. AMBROSE     3,075,644
MATERIALS SEPARATING APPARATUS AND DRIVE MECHANISM THEREFOR
Filed July 9, 1957     15 Sheets-Sheet 10

INVENTOR.
FREDERICK S. AMBROSE
BY
HIS ATTORNEY

Jan. 29, 1963  F. S. AMBROSE  3,075,644
MATERIALS SEPARATING APPARATUS AND DRIVE MECHANISM THEREFOR
Filed July 9, 1957  15 Sheets-Sheet 11

INVENTOR.
FREDERICK S. AMBROSE
BY
HIS ATTORNEY

INVENTOR.
FREDERICK S. AMBROSE
BY Stanley J Price
HIS ATTORNEY

Jan. 29, 1963  F. S. AMBROSE  3,075,644
MATERIALS SEPARATING APPARATUS AND DRIVE MECHANISM THEREFOR
Filed July 9, 1957  15 Sheets-Sheet 13

INVENTOR.
FREDERICK S. AMBROSE
BY
HIS ATTORNEY

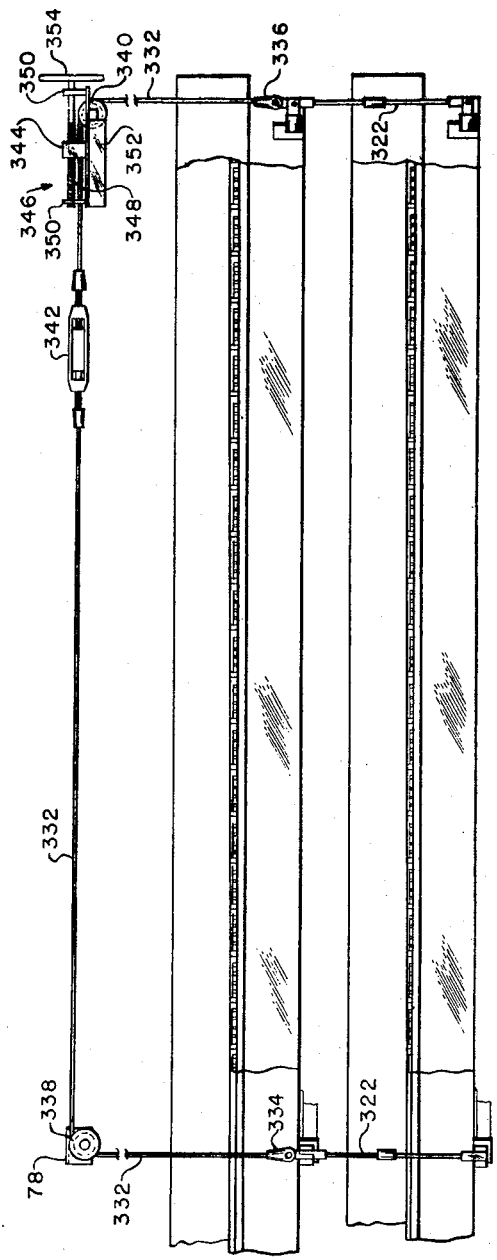

Jan. 29, 1963   F. S. AMBROSE   3,075,644
MATERIALS SEPARATING APPARATUS AND DRIVE MECHANISM THEREFOR
Filed July 9, 1957   15 Sheets—Sheet 15

*INVENTOR.*
FREDERICK S. AMBROSE
BY
HIS ATTORNEY

United States Patent Office 3,075,644
Patented Jan. 29, 1963

3,075,644
MATERIALS SEPARATING APPARATUS AND
DRIVE MECHANISM THEREFOR
Frederick S. Ambrose, Tucson, Ariz., assignor by mesne assignments, to Galis Electric & Machine Company, Morgantown, W. Va., a corporation of West Virginia
Filed July 9, 1957, Ser. No. 670,798
10 Claims. (Cl. 209—503)

This invention relates to an improved materials separating apparatus and more particularly to improved concentrating tables.

This application is a continuation-in-part of my co-pending application S.N. 613,165, filed October 1, 1956, now abandoned.

The concentrating table type of materials separating apparatus is used extensively to separate mixed materials having different specific gravities. The basic elements of the concentrating table assembly are the riffled deck and the head or drive mechanism. The head mechanism imparts a substantially horizontal reciprocating motion to the deck. The riffles, which may extend substantially parallel to the direction of the reciprocating motion, control the directional movement of the heavier material in the mixture. In conventional practice, the mixture of materials in a water carrier is fed onto the deck adjacent the drive mechanism in a direction transverse to the reciprocating movement of the deck. The reciprocation of the deck exerts both a conveying action and a stratifying action on the mixture of material. The conveying action is in a direction away from the head mechanism and toward the opposite end of the deck, which for convenience will hereinafter be referred to as the discharge end of the deck. The transverse flow of the water exerts a conveying action on the material in a direction transverse to the direction of reciprocation. The heavier material in the mixture stratifies on the bottom of the bed and the lighter material stratifies on the top of the bed. As the mixture of heavy and light material is conveyed transversely across the table by the water current, the heavy material is trapped in the troughs by the riffles and restrained by the riffles from moving transversely across the deck. The conveying action of the deck conveys the heavier particles trapped in the troughs between the riffles toward the discharge end of the deck opposite the head mechanism. The lighter material in the mixture is conveyed in the water over the riffles in a transverse direction across the deck and is discharged along the side portion of the deck, which, for convenience, will hereinafter be referred to as the discharge side of the deck. The lighter material in the mixture is also controlled by the riffles to the extent that the coarser light particles flow over the riffles at their highest point and discharge along the discharge side near the head mechanism end. It is also customary to construct the riffles so that they taper toward the discharge end. With this construction the light particles of decreasing size flow over the riffles for discharge along the discharge side of the deck, thus, in addition to separating materials, a sizing action is also produced. This sizing action is, however, not dependent upon the riffles alone and can be obtained on an unriffled deck.

The decks are adjustably supported so that the riffled surface of the deck may be tilted or rotated about the axis of reciprocation to either raise or lower the discharge side of the deck. This adjustment is commonly called "side tilt." The "side tilt" adjustment provides one means to control the flow of water transversely across the deck which in turn either increases or retards the transverse velocity of the particles across the deck. The decks are also adjustably supported so that the discharge end of the deck may be raised or lowered. This adjustment is commonly referred to as an end elevation adjustment. The "end elevation" adjustment also provides a control means for the longitudinal flow of water and solids.

It has been found that a peculiar vibratory motion of the deck is required to obtain proper separation of the mixture. The forward motion of the deck must be terminated suddenly and the direction of motion quickly reversed. The reverse motion must be terminated slowly and the direction of motion slowly reversed. In other words, for proper separation there must be an accelerated forward motion terminating in a quick reversal rather than a smooth harmonic motion. The accelerated forward motion assists in both stratifying the material in the conveying liquid and in providing forward inertia to the particle. The quick reversal literally pulls the deck out from under the particle so that the particle as it attempts to settle in the liquid has advanced longitudinally along the deck. This peculiar vibratory motion may be defined as a rectilinear differential motion. In fact, the conveying ability of the motion is dependent upon the differential of the motion.

In the conventional concentrating tables elaborate arrangement of parts is required to obtain the proper reciprocating motion. For example, the deck is slidably positioned on a supporting member and the supporting member is rigidly secured either to structural members of the building or to rigid concrete foundation blocks. The head motion mechanism is rigidly secured to one end of the supporting member so that the head motion and supporting member assembly are rigidly secured to the building structure. A coil spring is secured to the supporting member and to the front or discharge end of the deck. The head motion mechanism is attached to the deck so that it may pull the deck against the force of the spring. The forward motion of the deck (toward the discharge end) is imparted by the coil spring. At its extremity this forward motion is suddenly arrested by the head motion mechanism which then pulls the deck toward the head motion and at the same time compresses the spring in preparation for the next stroke. The spring thus acts as the pushing force and the head motion mechanism acts as the pulling force for the deck. The sudden stoppage of the forward stroke by the head motion mechanism transmits the forward momentum of the deck to the table supporting structure and in turn to the building structure. In order to provide satisfactory reciprocating motion to the deck, the foundation and structural members of the building must be of sufficient strength and size and have sufficient inertia to prevent the building structure from setting up consonant vibrations. Thus the foundation and structural members not only support the table but also must function as a vibration resisting means. During operation of the tables it is necessary that the foundation and structural members remain vibration free and not shake as a result of the reciprocating motion imparted to the decks. Even a slight vibration in the foundation or structural members interferes with the peculiar reciprocating action of the deck required for proper separation.

In installations employing a plurality of conventional concentrating tables the size of the building foundation and structural members is dictated by the number of concentrating tables housed therein and not by the relative weight supported by the structural members and foundation. This added vibration resisting function of the building foundation and structural members requires a relatively expensive structure to house a limited number of concentrating tables. It also limits the number of additional tables that may be added to an existing installation. This last limitation in turn limits the future expansion and capacity of a given installation.

The problem of floor space within the building also limits the number of concentrating tables per installation. With the conventional tables it is now necessary that they be arranged in side-by-side relation with individual drives for each deck and individual feed and withdrawal conduits leading to and from each deck. Thus the vibration and floor space problems require large sturdy building structures for a relatively limited number of separating tables. My improved concentrating table solves the above stated problems and provides the required vibratory motion without transmitting the resulting vibration to the building structure. This is accomplished by freely supporting my deck and drive mechanism by flexible means and providing a drive mechanism that not only produces its own driving force but also produces its own stopping force. With my arrangement, the building structure and flexible supporting means serve only to support the decks and drive mechanism, the drive mechanism in turn supplying the peculiar vibratory motion to the freely supported decks. In addition, my improved concentrating table may include a plurality of decks assembled in spaced overlying relation so that the decks may be supported from a common supporting means and secured to a single drive or head mechanism. The multiple deck feature reduces the floor space requirement per deck and it has been found that the power requirement per deck is also materially reduced. The feature of the drive mechanism providing its own driving force and stopping force materially reduces the requirements in structural steel and concrete foundations formerly required and enables existing installations to expand capacity without reinforcing the building structure.

It is therefore the primary object of this invention to eliminate vibration in buildings or other structures which support concentrating tables or the like.

Another object of this invention is to provide a concentrating table assembly having a plurality of decks so supported and driven as to operate for long periods of time without mechanism failure.

Another object of this invention is to provide a concentrating table assembly wherein the character of the reciprocatory movement of the deck imparts to particles of material, on the deck, motion of a character such as to produce improved separating action.

Another object of this invention is to provide a concentrating table assembly having a drive mechanism that both moves the decks and also stops the decks at both ends of the stroke.

A further object of my invention is to provide a concentrating table assembly having a plurality of decks and requiring reduced power requirements per deck for operation.

Another object of my invention is to provide a drive means capable of imparting rectilinear differential motion to a freely suspended body.

Another object of my invention is to provide a drive means that is capable of producing its own driving forces and its own stopping forces.

Another object of my invention is to provide a novel means for adjusting both end elevation and side tilt of the deck by adjusting the same supporting member.

Another object of my invention is to provide a novel means for adjusting both end elevation and side tilt of the deck during operation of the concentrating table.

These and other objects will become apparent from time to time throughout the specification and claims as hereinafter related.

This invention comprises the new and improved construction and combination of parts and their operating relation to each other which will be described more fully hereinafter and the novelty of which will be particularly pointed out and distinctly claimed.

In the accompanying drawings to be taken as part of this specification there is fully and clearly illustrated several embodiments of my invention in which drawings:

FIGURE 1 is a perspective view of my materials separating apparatus which illustrates one form of the adjustable hanger and suspension means.

FIGURE 2 is a view in side elevation illustrating the arrangement of the head mechanism and the adjustable hanger and suspension means illustrated in FIGURE 1.

FIGURE 3 is a view in front elevation illustrating the hanger and suspension means shown in FIGURE 1.

FIGURE 4 is a view in rear elevation illustrating the arrangement of the drive mechanism in relation to the separating decks as shown in FIGURES 1 and 2.

FIGURE 5 is a top plan view of the embodiment shown in FIGURE 1 illustrating the arrangement of the drive mechanism relative to the deck and indicating the direction of reciprocation.

FIGURE 6 is a detail sectional view taken along the line 6—6 of FIGURE 5 illustrating in side elevation the arrangement of the gearing and eccentric members within the drive mechanism.

FIGURE 7 is a sectional plan view of the drive mechanism taken along the line 7—7 of FIGURE 6 and illustrating in plan the arrangement of the gearing and eccentric members within the drive mechanism.

FIGURE 8 is a sectional view in front elevation of the drive mechanism taken along the line 8—8 of FIGURE 6.

FIGURE 9 is a fragmentary detail view of the adjustable hanger and suspension means illustrated in FIGURES 1 and 3.

FIGURE 17 is a sectional view in elevation taken along the line 17—17 of FIGURE 11 illustrating the adjustable supporting means for the side portions of the decks.

GENERAL DESCRIPTION

Figure 10:
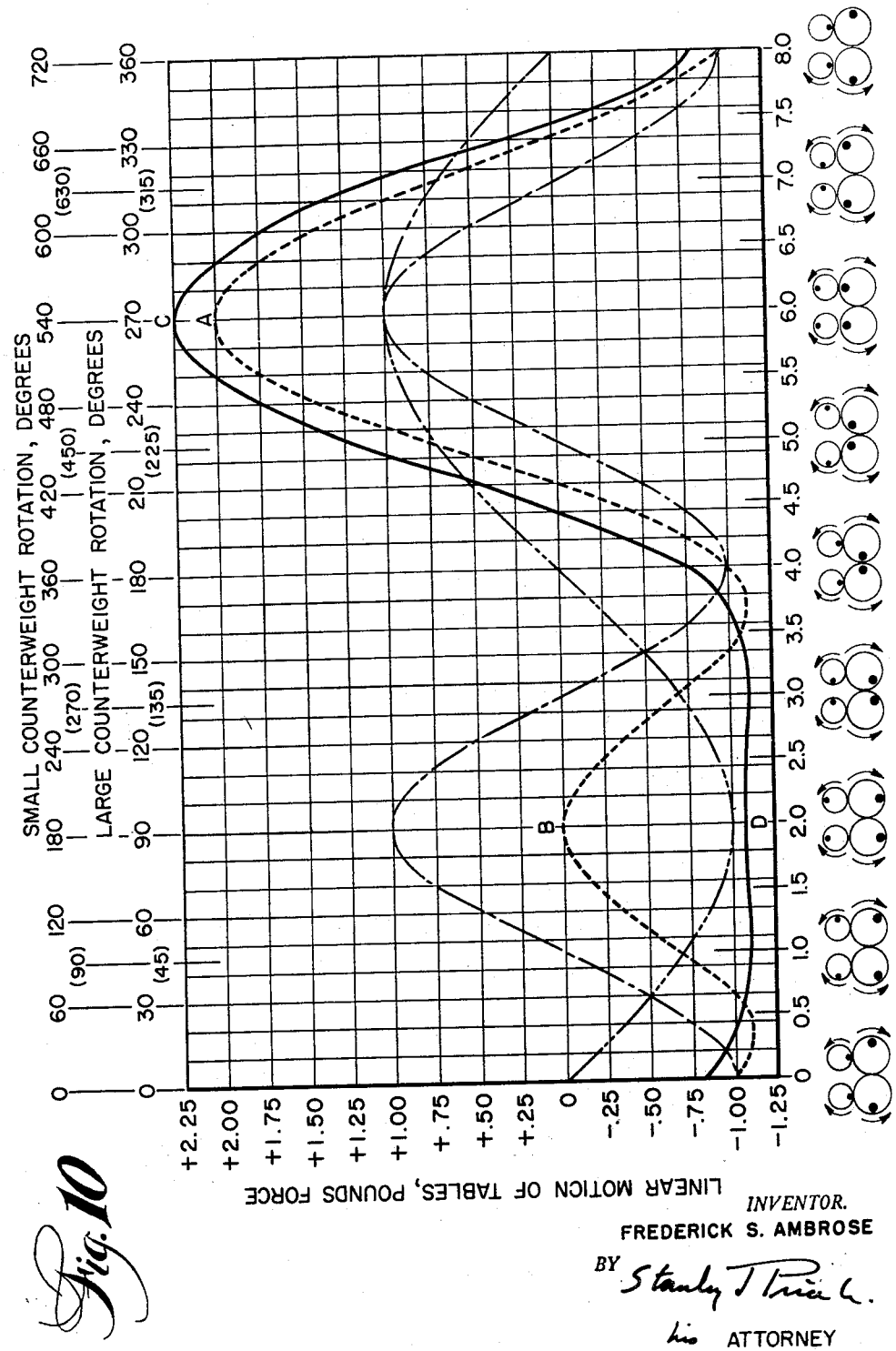
FIGURE 10 is a diagram of the motion imparted to the materials separating apparatus by means of the drive mechanism.

Referring generally to FIGURES 1 through 5 my invention includes a concentrating table assembly having a pair of materials separating decks 2 and 4 which are suspended in overlying spaced parallel relation to each other. The front or discharge ends of the decks 2 and 4 are suspended from a hanger means 6 by a flexible cable 8. The rear ends of the decks 2 and 4 are operably secured to a drive mechanism 10 by means of a bracket member 12. The bracket member 12 in addition to securing the decks to the drive mechanism 10 maintains the decks 2 and 4 in proper spaced overlying relation to each other. As illustrated in FIGURES 2, 4 and 5, the drive mechanism 10 is suspended from a rear hanger means 14 (FIGURE 2) by means of a plurality of flexible cables 16. An electric motor 18 is coupled by means of a belt and pulley arrangement 20 to an input drive pulley or sheave 22 that is in turn operatively connected to the drive mechanism 10. The motor 18 is operable to impart rotary motion to the input drive pulley 22 which, in turn, through an arrangement of eccentric members, to be later described, translates the rotary motion of the input drive pulley 22 to horizontal rectilinear differential motion of the drive mechanism 10. Since the drive mechanism 10 is secured to both decks 2 and 4 by means of the bracket 12, the horizontal rectilinear differential motion of the drive mechanism 10 will be equally imparted to both the decks 2 and 4.

The embodiment illustrated in FIGURES 1 through 5 illustrates discharge troughs or launders 24 and 26 secured to each of the decks. The discharge troughs 24 and 26 are arranged to receive the material discharged from the discharge side and end of the decks. The troughs 24 are connected to a common discharge conduit 28 and the troughs 26 are in turn connected to a second discharge conduit 30. Thus with the arrangement illustrated in FIGURES 1 through 5 the troughs 24 and 26 are an integral part of the decks 2 and 4 and reciprocate therewith. It should be understood, however, that the discharge troughs or launders may be separately mounted so that they are not supported or carried by the decks.

Since the materials separating decks 2 and 4 are similar in construction, only deck 2 be described in detail and similar numerals are intended to indicate similar parts on each of the decks 2 and 4.

As shown in FIGURE 5 the materials separating deck 2 is a rhombohedron and has a pair of parallel side portions 32 and 34. The side portion 32 is the portion along which the mixed materials and liquid carrier are fed onto the deck 2. The side portion 34 is the portion along which the lighter material, or the material having the smaller specific gravity is discharged. The side portion 34 is commonly called the discharge side of the deck. The deck 2 also has a rear end wall portion 36 and a front discharge end portion 38. The deck 2 is provided with a plurality of riffles 40 which in this instance extend substantially parallel to the drive axis indicated by the line 42. Secondary riffles 44 extend adjacent and substantially parallel with the feed side portion 32 and are arranged to convey large particles of material having high specific gravity toward the discharge end portion 38. The riffles 40, although not illustrated, may be constructed so that they taper toward the discharge end 38.

A channel member 46 is secured to the under side of the deck 2 adjacent the discharge end portion 38. The channel member 46 is substantially perpendicular to the drive axis 42 with a portion thereof extending beyond the deck feed side portion 32. The channel 46 has a pair of cable clip members 48 secured thereto in spaced relation to each other and located at equal distances from and on opposite sides of the drive axis 42 (FIGURES 3 and 9). The deck 2 has an aperture 50 therethrough which is aligned with the cable clip member 48 and serves as a passageway for the front cable 8 through the deck 2.

As shown in FIGURES 1, 2 and particularly FIGURE 5, the connecting bracket member 12 has a front body portion 52 and a pair of rearwardly extending flanges 54 and 56. The flanges 54 and 56 are parallel to and spaced from each other with aligned apertures 58 therethrough (FIGURE 2). The bracket body portion 52 is secured to the rear end wall portion 36 of both decks 2 and 4 by means of bolts 59 extending through slotted apertures 61 in the deck rear end walls 36. The slotted apertures 61 facilitate side tilt of the decks 2 and 4 relative to the drive mechanism 10 as will later be explained. The bracket body portion 52 is positioned so that the weight of the table assembly, that is, the weight of the decks 2 and 4, the drive mechanism 10, and the troughs 24 and 26, is equally distributed on both sides of the drive axis 42 as shown in FIGURE 5. With this arrangement everything that is suspended by means of the cables 8 and 16 is balanced about the axis of reciprocation 42.

The drive mechanism 10 has an external housing 60 with side walls 62 and 64 having outwardly extending flanges thereon (FIGURE 4). Adjacent the front and rear edges of the housing 60 along the flanges of side walls 62 and 64 there are positioned cable connectors 66 (FIGURES 1 and 2). The cable connectors 66 are similar in construction and are operable to hingedly secure the cables 16 to the drive mechanism 10. Secured to the front end of the drive mechanism housing 60 there is a coupling member 68 which has a pair of outwardly extending flanges 70 and 72. The flanges 70 and 72 are spaced from each other in parallel relation and have aligned apertures 74 therethrough. The bracket member 12 is positioned with the flanges 54 and 56 between the coupling member flanges 70 and 72 with the bracket apertures 58 aligned with the coupling member apertures 74. A pin member 76 hingedly secures the drive mechanism 10 to the materials separating tables 2 and 4. With the above described connection the decks may be pivoted about the pin member 76 thus changing the longitudinal inclination or end elevation of the decks 2 and 4 without changing the relative position of the drive mechanism 10. Accordingly when the drive mechanism 10 is secured to the hanger means 14 by the cables 16 and ajusted to transmit horizontal motion, the fact that the longitudinal axis of the decks has been changed does not influence the horizontal motion imparted by the drive mechanism 10. However, with the specific construction of the bracket 12 and coupling member 68 the decks 2 and 4 are secured to the drive mechanism 10 so that the direction of motion imparted by the drive mechanism 10 will be transmitted through the pin member 76 to the decks 2 and 4, thus assuring the transmittal of the rectilinear motion of the drive mechanism 10.

*Front Hanger Member and End Elevation or Longitudinal Deck Adjusting Means*

As shown in FIGURES 2 through 4 the front and rear hanger means 6 and 14 are secured to longitudinal and lateral structural beams 78 and 80 (FIGURE 2) which may be either an independent supporting frame or a part of the building structure. The front hanger means 6 has a pair of longitudinal channels 82 and 84 which are secured by means of upwardly extending end portions 86 to the longitudinal and lateral structural beam members 78 and 80 (FIGURE 2). The channels 82 and 84 (FIGURE 1) extend substantially parallel to the drive axis 42 and are preferably spaced equidistant on either side of the drive axis 42. A pair of vertical receiver members 88 and 90 (FIGURE 1) are secured respectively to the web portion of the channels 82 and 84. The receiver members 88 and 90 have inwardly extending flanged portions 92 and 94 which extend below the web portions of the channels 82 and 84. The inwardly extending receiver flange 92 has a pair of longitudinally extending aligned slots 96 and 98 therethrough (FIGURES 1 and 9). Similarly the other receiver member inwardly flanged portion 94 has a pair of longitudinally extending aligned slots 100 and 102. A transverse channel 104 is positioned with its web portion abutting the inwardly extending receiver flanges 92 and 94. Bolts 106 and 108 extend through apertures provided in the transverse channel 104 and through the respective slots 98 and 102. Above the upper flange of the transverse channel 104 there are positioned a pair of retainer members 110 and 112 which have outwardly extending portions 114 and 116 respectively that abut the outer ends of the upper flange of the transverse member 104 (FIGURES 1 and 9). The body portions 118 and 120 of the retainer members 110 and 112 abut the receiver member inwardly extending flanges 92 and 94. Bolt members 122 and 124 extend through apertures provided in the retainer member body portions 118 and 120 and through the respective slots 96 and 100 in the receiver flanged portions 92 and 94. Back-up plates 126 and 128 are positioned on the other sides of the receiver flange portions 92 and 94 and have apertures through which the respective bolts 106, 108, 122 and 124 extend. Nuts 130 secure the retainer members 110 and 112 and transverse channel 104 to the receiver members 88 and 90. Below the lower flange of the transverse channel 104 there are secured to the receiver flanges 92 and 94 a pair of adjusting bolt retainer members 132 and 134. The bolt retainer members 132 and 134 have rearwardly extending portions 136 and 138 with vertical threaded apertures 140 and 142 therethrough. Bolt members 144 and 146 are threadably secured in the respective threaded apertures 140 and 142. Thus by the adjustment of bolts 144 and 146 the elevation of the transverse channel 104 relative to the receiver members 92 and 94 may be changed. Prior to adjustment of the elevation of channel 104 it is necessary to loosen nuts 130 so that bolts 106, 108, 122 and 124 may slide in the respective receiver member slotted apertures 98, 102, 96 and 100. When the desired elevation of the channel 104 and the discharge end or longitudinal slope of decks 2 and 4 is reached by means of adjustment of bolts 144 or 146, the nuts 130 are again tightened thereby rigidly securing the transverse channel 104 to the receiver members 88 and 90.

Side Tilt or Lateral Deck Adjusting Means

The transverse channel 104 has a pair of spaced vertical slots 148 and 150 through its web portion. An adjusting channel 152 has a pair of apertures through its web portion which are aligned with the slots 148 and 150. Centrally located bolt 154 extends through the web portions of channel 104 and the lateral adjusting channel 152 thus pivotally positioning the web portions of the channels 104 and 152 in abutting relation with each other. Bolt members 156 and 158 extend through the transverse channel slotted apertures 148 and 150 and through the respective apertures in the adjusting channel 152. Nuts 160 serve to retain the adjusting channel 152 in an adjusted position of inclination relative to the transverse channel 104. Rotatably secured adjacent the ends of the adjusting channel 152 are a pair of peripherally grooved wheels 162 and 164 and centrally positioned on the adjusting channel 152 is cable clip member 166. The cable member 8 is secured at one end in the clip 48 of deck 4 (FIGURE 9) and extends upwardly through the aperture 50 in deck 4 and is secured to deck 2 by means of another clip 48. The cable also extends through aperture 50 in deck 2 and in the peripheral groove of the rotatable wheel 164 and in the peripheral groove of wheel 162. The other end of cable 8 is similarly secured to decks 2 and 4 by means of clips 48. The cable 8 is prevented from moving in respect to the adjusting channel 152 by means of clip 166 which rigidly secures the cable 8 to the lateral adjusting channel 152.

Before the channel 152 is pivoted about the bolt 154 to adjust the side tilt of the decks 2 and 4, the bolts 59 securing the drive mechanism 10 to the decks 2 and 4 are loosened. This permits movement of the bolts 59 in the deck rear wall slotted apertures 61 so that the side tilt of the decks may be adjusted while the drive mechanism remains in its original position. Thus by loosening nuts 160 the adjusting channel 152 may be pivoted about bolt 154 which in turn adjusts the lateral axis of decks 2 and 4 and since bolts 59 are loosened the drive mechanism remains in its original position. When the desired degree of lateral slope or side tilt is attained bolts 160 and 59 are again tightened to maintain the decks in their adjusted position. Cylindrical cap members 168 are positioned around the cable 8 adjacent the apertures 50 and prevent the liquid carrier from passing through apertures 50.

Rear Hanger Means

The front hanger means 6 includes a means to adjust both the longitudinal and lateral axes of the decks and the rear hanger means 14 serves to suspend the drive mechanism 10 in a fixed elevated position. The rear hanger means 14 consists of a plurality of depending members 170 secured to either the longitudinal or lateral structural members 78 and 80. Transverse channels 172 (FIGURES 2 and 4) are secured to the spaced depending members 170 and provide an anchor means for the longitudinal connecting members 174. As shown in FIGURES 2 and 4 the four turnbuckle members 176 are secured to the longitudinal connecting members 174 and extend downwardly therefrom. Cables 16 are connected at one end to the cable connectors 66 and at the other end to the turnbuckles 176 to suspend the drive mechanism 10 therefrom. The turnbuckles 176 are provided where minute initial adjustments may be required to provide equal weight distribution to all of the cables 16. The motor 18 is suspended at its front end from the connecting members 174 by means of cables or rods 178 and at the other end from the floor by means of a stand 180. Although the motor 18 is suspended from the floor by the stand 180, all of the reciprocating motion of the drive mechanism 10 is absorbed by the belt and pulley arrangement 20.

Drive Mechanism

The detail construction of the operating parts of the drive or head mechanism 10 is shown in FIGURES 6, 7 and 8. The drive mechanism 10 has an external housing 60 and a pair of side walls 62 and 64. Two pair of parallel shafts 182, 184 and 186, 188 are positioned within the drive mechanism housing 60 and are supported by the housing side walls 62 and 64. The shafts 182, 184 and 186, 188 are each rotatably secured in pairs of self-aligning bearings 190 operatively secured in the side walls 62 and 64. The shaft 188 extends beyond the housing side wall 62 and has the sheave 22 secured thereon (FIGURE 7). A pair of gears 194 and 196, which have the same pitch diameter and have the same number of gear teeth, are centrally secured to shafts 182 and 184 and are in meshing relation with each other. The shafts 186 and 188 have a pair of gears 198 and 200, which have the same pitch diameter and have the same number of teeth, secured centrally thereon. The pitch diameter of gears 194 and 196 is twice that of gears 198 and 200 and gears 194 and 196 have twice the number of gear teeth than gears 198 and 200. Gear 198 is in meshing relation with the gear 194 so that upon rotation of gear 194 gear 198 will rotate in the opposite direction with twice the speed of gear 194. Similarly gear 200 is in meshing relation with the gear 196 so that upon rotation of gear 200 gear 196 will rotate in the opposite direction at one-half the speed of gear 200. Therefore when sheave 22 rotates, gears 198 and 200 rotate in opposite directions to each other at the same speed and the gears 194 and 196 rotate in a direction opposite to each other at one-half the speed of gears 198 and 200.

Secured symmetrically on opposite sides of the gear 194 on shaft 182 are a pair of large counterweights or eccentric members 202 and 204 (FIGURE 7). The eccentric members are laterally equidistant from the gear 194 and revolve with the shaft 182. Secured to the shaft 184 are a second pair of large eccentric members 206 and 208. The large eccentric members 206 and 208 are spaced equidistantly from the gear 196 in a manner so they do not interfere with the eccentric members 202 and 204 as both gears 194 and 196 rotate in opposite directions. The radial displacement of the centers of gravity from the axis of rotation and the weight of the eccentric members 202, 204, 206 and 208 are equal and are arranged on the shafts 182 and 184 so that the effective forces of these eccentric members are cancelled in a vertical plane and are combined in a horizontal plane.

In a similar manner a pair of small eccentric members 210 and 212 are symmetrically secured to the shaft 186 adjacent to the gear 198 and revolve with shaft 186. A second pair of small eccentric members 214 and 216 are secured to the shaft 188, equidistant from the gear 200 and adjacent the housing side walls 62 and 64. The eccentric members 214 and 216 are so positioned that they do not interfere with the other small eccentric members upon rotation of the gears 198 and 200 in opposite directions. The radial displacement of the centers of gravity from the axis of rotation of the eccentric members 210, 212, 214, 216 are equal and are arranged on the shafts 186 and 188 so that the effective forces of these eccentric members are cancelled in a vertical plane and are combined in a horizontal plane.

All of the large eccentric members 202, 204, 206 and 208 have a pair of apertures 218 and 220 therethrough which are adapted to receive weights or plugs 222 and 224 therein. Similarly the small eccentric members 210, 212, 214 and 216 have apertures 226 and 228 therethrough which are also adapted to receive weights or plugs 230 and 232 therein. Any suitable means may be provided to retain the various weights in their respective apertures. By changing the weights or plugs in the various eccentric members the length of stroke and the differential of the drive mechanism may be changed. Since particle travel on the decks is dependent upon the motion differential the particle travel may also be increased or decreased by changing the weights in the various eccentrics.

FIGURE 6 illustrates one arrangement of the respective positions of the eccentric members to each other. In this figure the large eccentric members 202, 204, 206 and 208 are exerting a force in a direction toward the front coupling member 68, which, in effect, is a force toward the decks 2 and 4. The small eccentric members 210, 212, 214 and 216 are exerting a force in a direction opposite to the large eccentric members which, in effect, is away from the decks 2 and 4.

As the respective eccentric members rotate the resultant force of each of the eccentrics continually changes in direction. This resultant force has a horizontal component and a vertical component. Due to the geared connection between the pairs of large eccentric members the vertical component of the respective pairs of large eccentric members are always equal and opposite to each other so that the sum of the vertical components for the large eccentric members is always substantially zero. Accordingly, centrifugal forces of the large eccentrics may be expressed by the remaining horizontal component. Similarly the centrifugal forces exerted by the small eccentric members may be expressed by their horizontal component. For example, in FIGURE 6, assume the large eccentric members 202, 204, 206 and 208 have rotated to a position where eccentrics 202 and 204 are 45° below the horizontal plane. At this point weights 202 and 204 have a downward vertical component and a rearward horizontal component. Eccentrics 206 and 208 at the same instant because of their geared relation to eccentrics 202 and 204 rotate in the opposite direction the same number of degrees and have an upward vertical component and a rearward horizontal component. The downward vertical component of eccentrics 202 and 204 is substantially equal to the upward vertical component of eccentrics 206 and 208 and hence the vertical component of the large eccentrics 202, 204, 206 and 208 cancel out. Since the horizontal component of these eccentrics are in the same direction their forces are additive which results in a horizontal rearward force of a given amplitude. In this manner as the large eccentrics rotate their centrifugal forces may be expressed by their horizontal component.

The small eccentric members 210, 212, 214 and 216 are also arranged so that the vertical component of eccentrics 210 and 212 are substantially equal to and opposite to the vertical components of eccentrics 214 and 216. Therefore any motion produced by the drive mechanism will be in a substantially horizontal plane and will be substantially rectilinear. The substantially horizontal rectilinear force results from the absence of vertical components between the large eccentrics and also an absence of vertical components between the small eccentrics.

The differential portion of the motion imparted by the drive mechanism 10 may be changed by increasing or decreasing the additive horizontal components of the various eccentrics in one direction and either increasing or decreasing the additive horizontal components in the other direction. This can be accomplished by either increasing or decreasing the effective weights of the various eccentrics by changing or removing the various weights or plugs 222, 224, 226 and 228. The horizontal components may also be changed by changing the "phase relationship" between the large eccentric members and the small eccentric members. By changing the phase relation I mean rotating the small eccentrics about their axes a given number of degrees while the large eccentrics remain in a horizontal position. This may be accomplished by disengaging gear 198 from gear 194 and gear 200 from gear 196. While the large eccentrics remain in the position illustrated in FIGURE 6 the small eccentrics are moved toward each other until small eccentrics 214 and 216 are a given number of degrees above horizontal and the small eccentrics 210 and 212 are substantially the same number of degrees below horizontal. By changing the "phase realtionship" between the large eccentrics and the small eccentrics the resultant horizontal components of all eccentrics is proportionately changed.

In the previous discussion it has been assumed that the effective weights of the large eccentrics are substantially equal to each other and the effective weights of the small eccentrics are substantially equal to each other.

A diagrammatic analysis of one example of the horizontal differential motion that may be obtained by my drive mechanism is illustrated in FIGURE 10. For this particular example the conditions were as follows. The weight of the large eccentric members was twice that of the small eccentric members and the eccentricity of the center of gravity of the large eccentrics was twice that of the small eccentric members. In addition, due to the gear ratios, the smaller eccentric members rotate at twice the speed of the large eccentric members. For this example the large and small eccentric members were "in phase." The graph illustrates the centrifugal forces exerted by the various eccentric members and the relative positions of the eccentric members to each other during one complete revolution of the large eccentric members. Because of the gear ratio the smaller eccentric members complete two revolutions per single revolution of the large eccentric members. The relative position of the large and small eccentric members at given instants of time is illustrated diagrammatically across the lower horizontal portion of the graph and numerically in degrees along the upper horizontal portion of the graph beginning with 0° at the left side of the graph and increasing toward the right side. The centrifugal force exerted (in the direction of reciprocation of the decks) by the various eccentric members as a result of their rotation is indicated vertically along the left ordinate of the graph. The forces are indicated as either positive or negative forces and 0 force is used as the abscissa. The centrifugal force exerted by all of the small eccentric members is indicated by a —·—·—· line. The centrifugal force exerted by the large eccentric members is indicated by a —··— line. The additive sum of the centrifugal forces which may be termed the theoretical resultant effective force of the combined large and small eccentric members is indicated by a ····· line. The actual resulting motion of the materials separating apparatus which for convenience may be termed the actual effective force exerted by the drive mechanism 10 is superimposed on the graph and is indicated by means of a solid line. Although the actual effective force curve is plotted as not leading nor lagging the theoretical resultant force curve, it is possible in actual operation that the resultant curve may lag behind the theoretical resultant curve. The actual effective force curve is simply superimposed for comparison with the theoretical resultant curve. In addition it has been determined that the slope of the actual effective force curve differs from the slope of the theoretical resultant curve. It should be understood that the curves in FIGURE 10 are the result of a single arrangement and other horizontal rectilinear differential motion may be obtained by changing the phase relationship of the small and large eccentric members or changing their effective weights.

The theoretical resultant motion curve was calculated by taking the sums of the forces exerted by the large eccentric members and the small eccentric members. This curve is indicated by dotted lines in FIGURE 10. The portion of the dotted curve between .5 and 2 indicates the acceleration during a forward stroke and the portion of the dotted curve between .2 and 3.5 indicates a return stroke. Similarly the portion of the dotted curve between 3.5 and 6 indicates a second forward stroke and the portion between 6 and 8 indicates a second return stroke. Theoretically and according to the calculated resultant forces exerted by the drive mechanism 10 there should be two complete forward and return strokes exerted by the drive mechanism during a single revolution of the large eccentric members. One of the strokes is indicated by the letter B, the other is indicated by the letter A. According to the theoretical curve the drive mechanism should impart to the decks a series of alternating strokes having different velocities.

The actual resultant curve, which is indicated by the solid line, exerts a single forward and return stroke for each revolution of the large eccentric members. This was determined during the actual operation of my materials separating apparatus. The actual motion imparted by my drive mechanism is a differential motion, that is, the drive mechanism has a swift reversal from forward stroke to the reverse stroke and a slow reversal from the reverse stroke to the forward stroke. The actual motion imparted by the drive mechanism is a differential motion as opposed to harmonic motion because of the difference in velocity in the drive mechanism during a complete revolution of the large eccentric members. The change in velocity is illustrated in FIGURE 10 where the sharp reversal from a forward stroke to a reverse or return stroke is indicated by the letter C and slow reversal from a reverse stroke to a forward stroke is indicated by the substantially horizontal segment of the solid line indicated by the letter D. This type of motion is particularly suitable for the separation of materials having different specific gravities and also for classifying material having the same specific gravity but of a different particle size or different particle shape. Using the graph of FIGURE 10 to illustrate, when the table is quickly reversed from the forward stroke to the reverse stroke as illustrated by letter C the table surface is literally pulled out from under the heavier gravity materials and during the slow reversal as indicated on the graph by letter D the heavy particles attempt to settle on the deck surface and are again positioned for the conveying action of the subsequent forward stroke. The motion imparted to the decks by my drive mechanism does not interfere with the stratification of the lighter gravity materials in the upper portion of the water carrier bed so that they may be conveyed transversely to the direction of motion.

Figure 11:
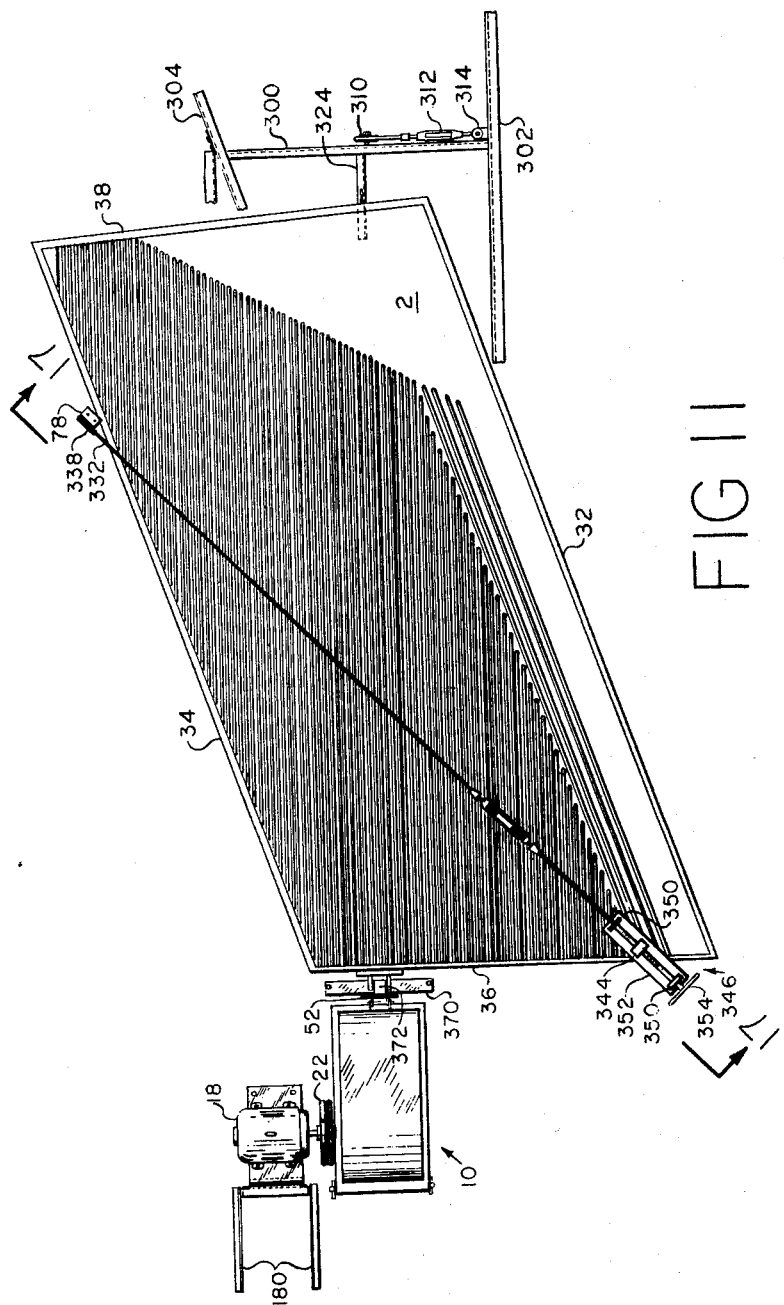
FIGURE 11 is a top plan view illustrating another form of hanger and adjustable suspension means for my concentrating table assembly.
Figure 12:
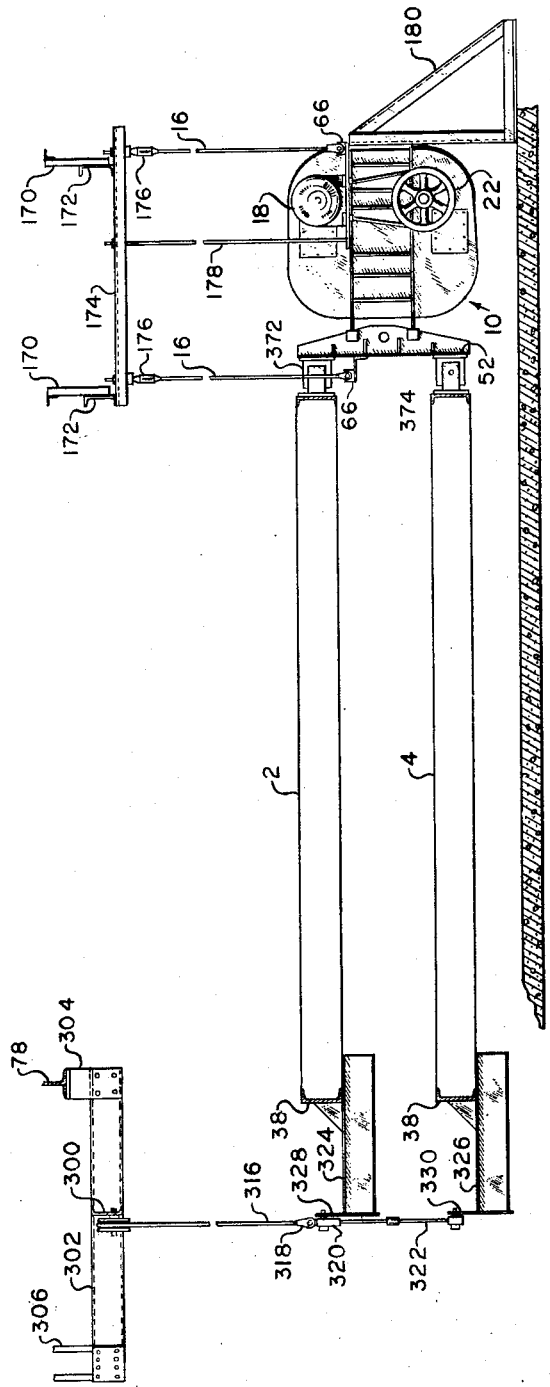
FIGURE 12 is a sectional view in side elevation illustrating the front hanger and adjustable suspension means illustrated in FIGURE 11.
Figure 13:
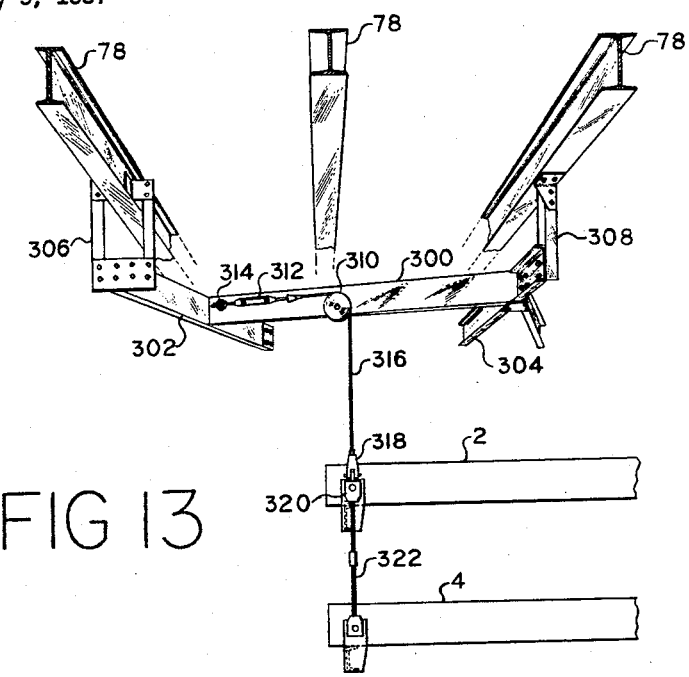
FIGURE 13 is a fragmentary front perspective view of the front hanger and adjustable suspension means shown in FIGURE 12.
Figure 14:
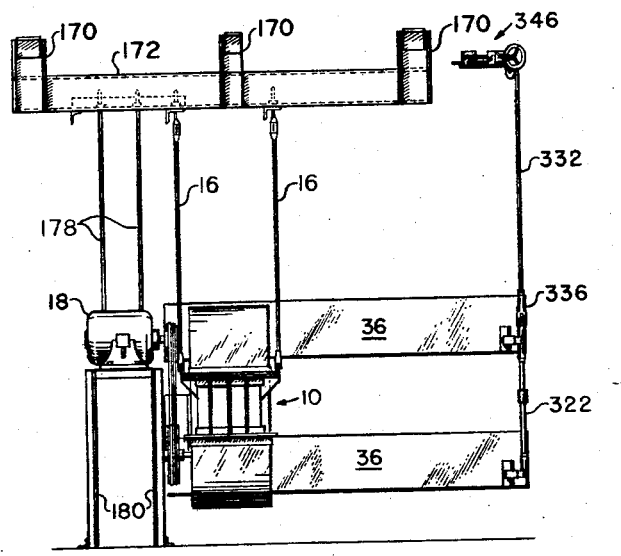
FIGURE 14 is a view in rear elevation similar to FIGURE 4 and illustrating a rear portion of the adjustable supporting means for the side portions of the decks.

As illustrated in FIGURES 11, 12 and 13 there is provided another means to adjust the longitudinal slope or end elevation of the decks 2 and 4. This is my preferred embodiment of the end elevation adjustment means. Throughout the description of the end elevation adjustment means illustrated in these figures, structure that is similar to structure heretofore described will be given the same numerals. Referring to these figures there is shown a transverse channel member 300 which is supported by channels 302 and 304. The channel 302 extends substantially parallel to the reciprocating axis of the decks 2 and 4. Channels 302 and 304 are in turn secured to the structural beams 78 by means of depending connecting members 306 and 308. The transverse channel 300 has a pulley member 310 secured thereto intermediate its end portions. A turnbuckle 312 is secured at one end to the transverse channel 300 adjacent channel 302 by means of a pin connection 314. The other end of the turnbuckle 312 is connected to one end of a cable 316. The cable 316 extends around the pulley 310 and has its other end connected to the decks 2 and 4 by a pin type hinge 318. The other portion 320 of the pin type hinge 318 forms a part of the connecting member 322. The decks 2 and 4 have beam members 324 and 326 secured thereto and extending forwardly therefrom substantially along the axis of reciprocation of the decks (FIGURES 11 and 12). The beams 324 and 326 have vertical plate members 328 and 330 at their front ends which are swivelly connected to the connecting member 322. With this arrangement the turnbuckle 312 may be employed to shorten or lengthen the cable 316 which in turn will raise or lower the discharge end of the decks 2 and 4 and adjust their end elevation. It is now possible with the above described apparatus to make end elevation adjustments of decks 2 and 4 while my materials separating apparatus is in operation.

In conjunction with the last described end elevation adjustment means the side portions of the decks are supported by a cable 332 that is connected to the decks adjacent the feed corner and along the discharge side 34 adjacent the discharge end 38. The cable 332 is hingedly connected to the decks 2 and 4 as illustrated in FIGURE 17 by means of pin type hinge members 334 and 336. The cable 332 extends around a pair of pulleys 338 and 340, which are connected to the overhead structural members 78 by suitable connections. The cable 332 is provided with a turnbuckle 342 intermediate its end portion which may be utilized to shorten or lengthen the cable after an end adjustment of the decks has been made. The cable 332 is secured to a block member 344 that is a part of a screw take-up mechanism 346. The screw take-up mechanism 346 has a threaded bar 348 that is rotatably supported in two upstanding members 350. The upstanding supporting members 350 are securde to the screw take-up body portion 352 which is secured to the overhead structure 78 (not shown). The threaded bar 348 extends through a threaded aperture in the block 344 so that upon rotation of the threaded bar 348 the block member 344 will move longitudinally relative to the screw take-up body portion 352. A handle 354 is secured to one end of the threaded bar 348 to facilitate rotation thereof. The cable 332 is connected to the threaded block 344 so that the cable moves in the grooves of the pulleys 338 and 340 as the block member is moved relative to the screw take-up body portion 352. Thus, by rotating the handle 354 the side tilt or lateral slope of the decks 2 and 4 may be changed. It should be also noted that the side tilt adjustment may be accomplished while my materials separating apparatus is in operation.

Figure 18:
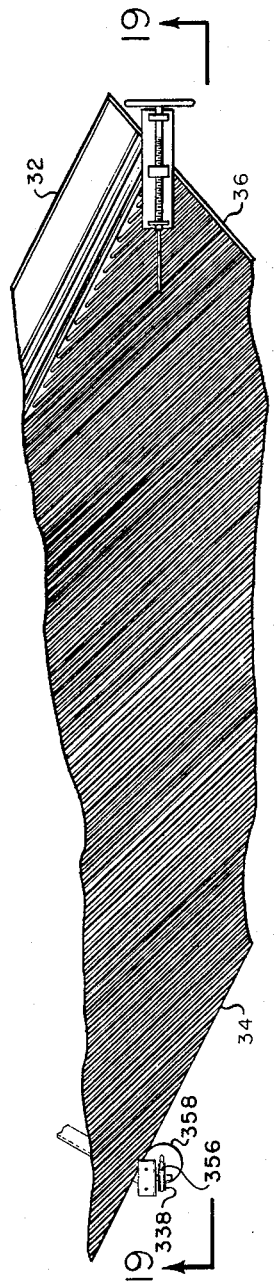
FIGURE 18 is a fragmentary top plan view illustrating another form of adjustable supporting means for the side portions of the decks.
Figure 19:
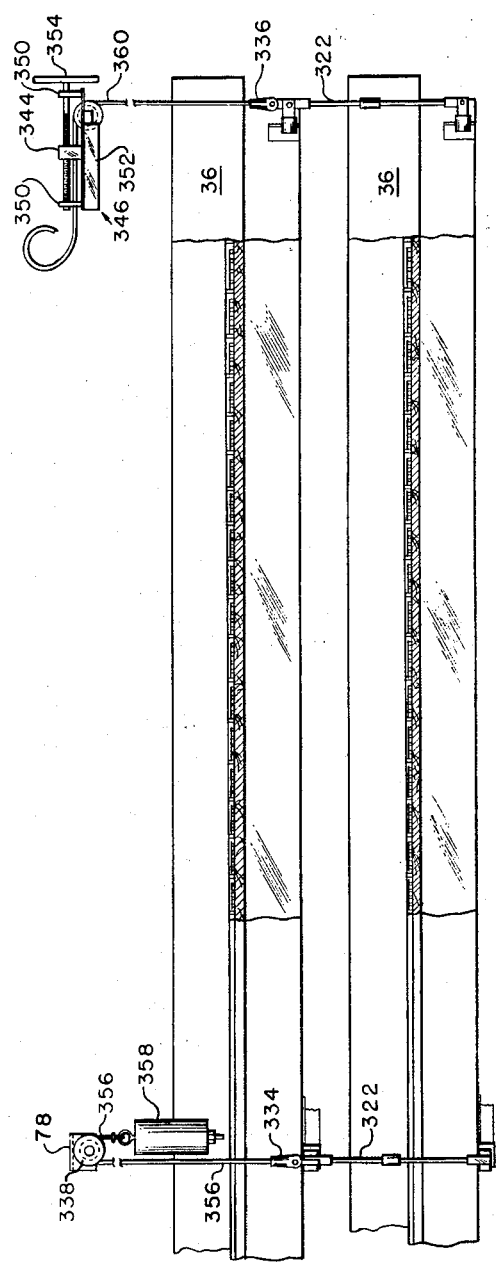
FIGURE 19 is a view in elevation taken along the line 19—19 of FIGURE 18.

The side tilt adjusting mechanism may also be constructed as illustrated in FIGURES 18 and 19. This is my preferred embodiment of the side tilt adjusting mechanism. In these figures the decks are supported at their discharge side 34 adjacent the discharge end 38 by means of a cable 356. The cable 356 has one end connected to a hinge mechanism 334 and extends around pulley 338. The other end of the cable 356 is connected to a counterweight 358. The other side of the decks is supported by another cable 360 which is connected to the block member 344 of a screw take-up mechanism 346 in a manner similar to the side tilt adjustment means illustrated in FIGURES 11 and 17. With the mechanism illustrated in FIGURES 18 and 19 both side tilt and end adjustments can be made without adjusting the length of the transverse cable.

Figure 16:
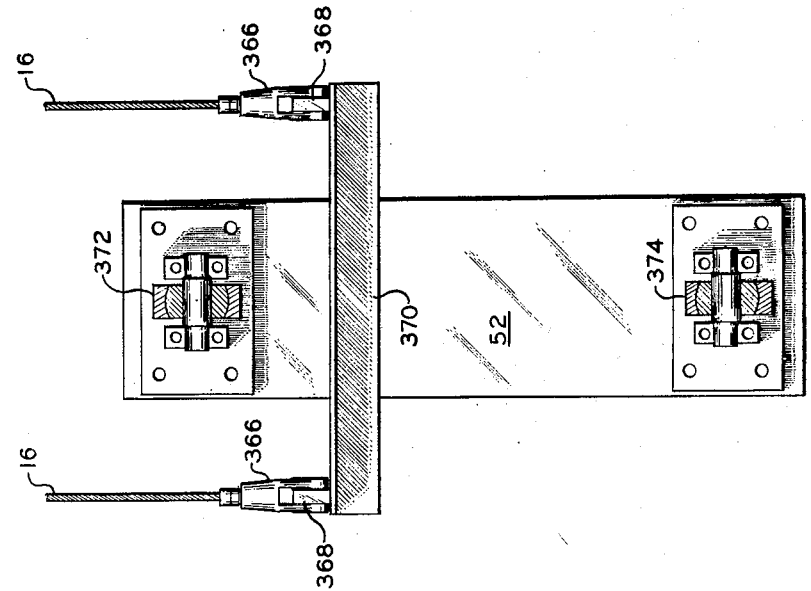
FIGURE 16 is a view in elevation taken along the line 16—16 of FIGURE 15.
Figure 15:
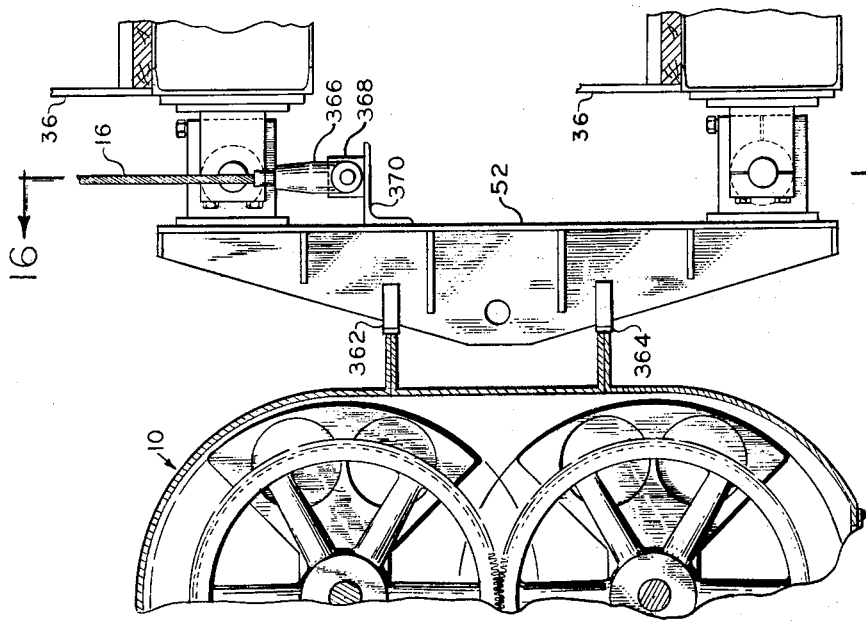
FIGURE 15 is a fragmentary sectional view in side elevation illustrating in detail another manner of connecting the drive mechanism to the decks.

The rear wall 36 of decks 2 and 4 may also be supported as shown in FIGURES 15 and 16. The drive mechanism 10 is rigidly secured to the connecting bracket 12 as shown at 362 and 364. The bracket 12 is in turn supported by cables 16 and a hinged connection 366. The hinged stationary portion 368 is in turn secured to the bracket 12 by means of an angle member 370. The deck rear walls 36 are connected to the bracket 12 by universal connections generally designated by the numerals 372 and 374. Due to the universal connections 372 and 374 side tilt adjustments may be made to the decks 2 and 4 without imparting the same tilt to the drive mechanism 10.

OPERATION

The operation of the materials separating apparatus will be described in connection with the separation of impurities from coal. As the raw coal is removed from the earth it contains a mixture of coal, bone, slate and stone. The latter impurities are known as refuse. The "bone" has a reasonably uniform composition and a specific gravity between 1.5 and 1.8. Coal has a specific gravity approximately 1.38. Thus my materials separating apparatus is particularly suited for the specific gravity separation of these impurities from coal. It should be understood, however, that the application of my materials separating apparatus is not limited to the separation of materials described herein since the materials described are used only for illustrative purposes.

The raw coal is mixed with approximately twice its weight of water and the suspension is fed onto the decks 2 and 4 adjacent the corner formed by the intersection of feed side wall 32 and the rear end wall 36. The stream of raw coal and water is fed at a predetermined rate onto the reciprocating tables transversely to the riffles 40.

To separate the refuse from the coal, the electric motor 18 is energized and the input drive pulley 22 is in turn rotated by the belt and pulley arrangement 20. The rotary motion of the input drive pulley 22 is translated to horizontal rectilinear differential motion of the drive mechanism by means of the eccentric members rotating therein. The belt and pulley arrangement 20 provides a speed reduction between the electric motor 18 and the shafts 182 and 184 so that the shafts rotate at approximately 270 r.p.m. As heretofore stated, for each revolution of the shafts 182 and 184 one complete stroke is exerted by the drive mechanism 10. Thus as the motor 18 is energized the drive mechanism 10 imparts approximately 270 strokes per minute to the materials separating decks 2 and 4.

As the water and coal mixture is fed onto the decks 2 and 4 the horizontal rectilinear motion of the tables distributes the raw coal-water mixture in a fan-like direction. The refuse impurities having the higher specific gravity are trapped in the troughs between the riffles 44 and 40 and the coal having the lower specific gravity remains stratified in the upper layer of the water carrier. As the mixture, under the conveying influence of the motion imparted to the decks and the transverse flow of water, progresses toward the deck side portion 34 and end portion 38, the refuse impurities are conveyed by means of the reciprocal motion of the tables along the riffles 40 and are discharged into a trough 24 adjacent the deck discharge end portion 38. The coal particles remaining stratified in the upper layer of the water carrier are conveyed transversely with the water and discharged into a trough 26 along the deck discharge side portion 34. The troughs 24 from both decks 2 and 4 convey the impurities to a common discharge conduit 28. The troughs 26 receiving the cleaned coal and water carrier convey the same to a second discharge conduit 30. In this manner effective separation of impurities from raw coal may be accomplished.

Thus, my materials separating apparatus now makes it possible to suspend a plurality of materials separating decks from a common supporting structure and eliminates any means for absorbing the vibratory forces exerted by the decks. The drive mechanism which I use as a part of my materials separating apparatus provides a horizontal rectilinear differential motion which is useful in the separation of materials having different specific gravities. The drive mechanism which I employ not only produces the movement required for the particular motion but also produces its own stopping forces.

Although the drive mechanism 10 has been described in conjunction with a materials separating apparatus it should be understood it is withing the scope of this invention to utilize the motion obtained by the drive mechanism 10 in conjunction with other types of material treating apparatus.

While there is in this application specifically described several forms which the invention may assume in practice, it will be understood that these forms of the same are shown for purposes of illustration and that the invention may be modified or embodied in various other forms without departing from its spirit or the scope of the appended claims.

According to the provisions of the patent statutes, I have explained the principle, preferred constructions and mode of operation of my invention and have illustrated and described what I now consider to represent its best embodiments. However, I desire to have it understood that, within the scope of the appended claims, the invention may be practiced otherwise than as specifically illustrated and described.

I claim:
1. In a materials separating apparatus the combination comprising a pair of separating decks arranged in overlying spaced relation to each other, hanger means above said pair of decks, flexible cable means suspending said decks from said hanger means in substantially parallel relation to each other and in substantially horizontal planes, drive means including a plurality of eccentric weights rotatable in vertical planes, said drive means being secured to and movable with said pair of decks and operable to impart substantially horizontal rectilinear reciprocating motion thereto, said drive means including means to change the direction of said reciprocating motion from a forward direction to a reverse direction at a greater speed than the change in direction of said motion from a reverse direction to a forward direction.

2. In a materials separating apparatus the combination comprising a pair of separating decks each having a front end portion and a rear end portion, a bracket member secured to the rear end portion of each of said decks in a manner that the rear end portions of said decks are in spaced parallel relation to each other, a drive mechanism secured to said bracket member, front hanger means positioned above and adjacent to said front end portion of said decks, flexible means suspending said front end portions of said decks in spaced parallel relation to each other from said front hanger means, rear hanger means positioned above said drive mechanism, and second flexible means suspending said drive mechanism and said deck rear end portion from said rear hanger means, said drive mechanism being operable to impart substantially horizontal rectilinear reciprocating motion to said decks, said drive means including means to change the direction of said reciprocating motion from a forward direction to a reverse direction at a greater speed than the change in direction of said motion from a reverse direction to a forward direction.

3. A slope adjustment mechanism adapted to adjust the lateral slope of a materials treating platform comprising a hanger means positioned above said platform, a pair of pulley wheels secured to said hanger means on opposite sides of the longitudinal axis of said platform, a plurality of flexible cables depending from said hanger means and secured to said platform to thereby suspend said platform from said hanger means, said plurality of cables including a cable having its end portions depending from said hanger means and secured to said platform on opposite sides of the longitudinal axis of said platform and its intermediate portion supported by said pulley wheels, and means to move said last named cable in a lateral direction relative to said platform and said hanger means to thereby vary the depending length of said cable end portions and in turn vary the lateral slope of said platform.

4. A slope adjustment mechanism adapted to adjust the lateral slope of a materials treating platform comprising a hanger means positioned above said platform, a pair of pulley wheels secured to said hanger means on opposite sides of the longitudinal axis of said platform, a plurality of flexible cables depending from said hanger means and secured to said platform to thereby suspend said platform from said hanger means, said plurality of cables including a first cable having one of its end portions secured to said platform on one side of the longitudinal axis of said platform, said first cable having its other end portion secured to a counterweight and its intermediate portion supported by one of said pulley wheels on the same side of said platform, said plurality of cables including a second cable having one end portion secured to said platform on the other side of the longitudinal axis of said platform, said second cable other end portion secured to an adjusting means mounted on said hanger means, said second cable intermediate portion supported by said other pulley wheel, and said adjusting means adapted to move said second cable laterally relative to said platform to change the depending length of said second cable to thereby adjust the lateral slope of said platform.

5. In apparatus for separating materials of different specific gravities wherein the different gravity particles to be separated are suspended in a liquid carrier as a slurry the combination comprising a pair of imperforate decks each having a top surface with a plurality of parallel spaced riffles extending upwardly therefrom, said decks arranged in overlying spaced relation to each other, hanger means above said pair of decks, flexible cable means suspending said decks from said hanger means in substantially horizontal planes, drive means secured to and movable with said decks, said deck top surfaces adapted to receive said slurry in a manner that said slurry flows laterally across said riffles, said riffles being adapted to confine said heavier gravity particles in the interstices formed therebetween, said drive mechanism constructed and arranged to impart a horizontal rectilinear reciprocating motion to said decks in a direction parallel to said riffles to thereby progressively advance said heavier gravity particles on said deck so that said heavier gravity particles are discharged from said deck in a direction parallel to said riffles and said lighter gravity particles are discharged from said deck in a lateral direction relative to said riffles, said drive means including means to change the direction of said reciprocating motion from a forward direction to a reverse direction at a greater speed than the change in direction of said motion from a reverse direction to a forward direction.

6. An adjustable hanger member adapted to adjust both the longitudinal and lateral axes of a materials separating table freely suspended therefrom by means of a flexible cable, said hanger member comprising a first channel member extending laterally of said table, said first channel member being secured adjacent its end portions to depending supporting members, said first channel member being movable vertically relative to said depending supporting members, means to adjust said first named channel member in a vertical plane relative to said supporting members, means to maintain said transverse channel in its adjusted position, a second channel member having its web portion in abutting relation with the web portion of said first channel member, means securing said channel members to each other and means for pivoting said second channel member relative to said first channel member to thereby adjust the lateral axis of said materials separating table suspended therefrom.

7. An adjustable hanger member adapted to adjust both the longitudinal and lateral axes of a materials separating table freely suspended therefrom by means of a flexible cable, said hanger comprising a first member extending laterally of said table, said first member secured to depending supporting members, said first member movable vertically relative to said depending supporting members, means for adjusting said first member vertically relative to said supporting members to thereby adjust the longitudinal axis of said materials separating table, a second member extending laterally of said table and secured to said first member, and means for pivoting said second member relative to said first member to thereby adjust the lateral axis of said materials separating table suspended therefrom.

8. In combination, a materials separating platform, drive means mounted on said platform for imparting reciprocatory longitudinal motion thereto, said drive means being connected to said table by a joint capable of transmitting said longitudinal motion but allowing said table to freely pivot with respect to said drive means about at least the longitudinal axis of said table, flexible suspension means supporting said drive means and flexible suspension means adjustably supporting said platform on opposite sides of said longitudinal axis, said last named suspension means being so interrelated that when one side of said platform is vertically moved, the other side of said platform is concomitantly moved in the opposite direction.

9. In combination, a materials separating platform, drive means mounted on said platform for imparting reciprocatory longitudinal motion thereto, said drive means being connected to said platform by a universal joint capable of transmitting said longitudinal motion but allowing said table to freely pivot with respect to said drive means about a pair of axes transverse and longitudinal, respectively, to said table, flexible suspension means supporting said drive means, flexible suspension means adjustably supporting said table on opposite sides of said longitudinal axis, said last named suspension means being so interrelated that when one side is vertically moved, the other side of said platform is concomitantly moved in the opposite direction, and means for raising and lowering the end of said table opposite said drive means independently of the adjustment of said flexible platform supporting means.

10. In a materials separating apparatus the combination comprising, a plurality of decks, support means, flexible connectors extending substantially vertically from said supporting means to said decks and connected thereto respectively to maintain said decks in a vertically spaced substantially horizontal relationship with each other and in a free horizontal floating relationship with said supporting means, a thrust transmitting member connecting said decks together at one end, and a free floating reciprocatory force generating means connected to said thrust transmitting member, the force generating means including a plurality of eccentric weights rotatable in vertical planes, said drive means being secured to and movable with said plurality of decks and operable to impart substantially horizontal rectilinear reciprocatory motion thereto, said drive means including means to change the direction of said reciprocatory motion from a forward direction to a reverse direction at a greater speed than the change in direction of said motion from a reverse direction to a forward direction.

(References on following page)

References Cited in the file of this patent

UNITED STATES PATENTS

| | | |
|---|---|---|
| Re. 11,756 | Bartlett | July 4, 1899 |
| 506,976 | Campbell | Oct. 17, 1893 |
| 771,107 | Wall | Sept. 27, 1904 |
| 1,053,367 | Eccleston | Feb. 18, 1913 |
| 1,201,151 | Cooley | Oct. 10, 1916 |
| 1,207,452 | Wall | Dec. 5, 1916 |
| 1,280,269 | Miller | Oct. 1, 1918 |
| 1,651,934 | Sayers | Dec. 6, 1927 |
| 1,757,810 | Newman et al. | May 6, 1930 |
| 2,144,382 | Lincoln et al. | Jan. 17, 1939 |
| 2,178,813 | Shaler | Nov. 7, 1939 |
| 2,188,482 | Parks | Jan. 30, 1940 |
| 2,227,867 | Steinhaus | Jan. 7, 1941 |
| 2,299,661 | Symons | Oct. 20, 1942 |
| 2,367,070 | Symons | Jan. 9, 1945 |
| 2,415,993 | Cottrell | Feb. 18, 1947 |

FOREIGN PATENTS

| | | |
|---|---|---|
| 1,070,342 | France | July 27, 1954 |